United States Patent
Chih et al.

(10) Patent No.: US 7,798,457 B2
(45) Date of Patent: Sep. 21, 2010

(54) PIVOT SUPPORT DEVICE AND A DISPLAY APPARATUS SUPPORTED THEREON

(75) Inventors: Ting-Hui Chih, Hualien (TW); Wen-Ching Hsieh, Linkou Township (TW)

(73) Assignee: Qisda Corporation, Taoyuan County (TW)

( * ) Notice: Subject to any disclaimer, the term of this patent is extended or adjusted under 35 U.S.C. 154(b) by 505 days.

(21) Appl. No.: 11/756,433

(22) Filed: May 31, 2007

(65) Prior Publication Data

US 2008/0043411 A1   Feb. 21, 2008

(30) Foreign Application Priority Data

Jun. 7, 2006   (TW) .............................. 95120215 A (51) Int. Cl.
*E04G 3/00*   (2006.01)
*H05K 7/00*   (2006.01)

(52) U.S. Cl. ............ 248/284.1; 248/274.1; 248/292.14; 248/917; 361/679.02; 361/679.06

(58) Field of Classification Search .............. 248/274.1, 248/276.1, 278.1, 284.1, 125.7, 349.1, 121, 248/292.14, 299.1, 371, 917, 919, 922; 361/679.02, 361/679.04, 679.06, 679.12, 681, 683
See application file for complete search history.

(56) References Cited

U.S. PATENT DOCUMENTS 5,941,493 A * 8/1999 Cheng ........................ 248/371
6,189,842 B1 * 2/2001 Bergeron Gull et al. .. 248/125.1
6,816,364 B2 * 11/2004 Helot et al. ............. 361/679.06
6,966,532 B2 * 11/2005 Ishizaki et al. ........... 248/274.1
7,014,154 B2 * 3/2006 Jeong et al. .................. 248/157
7,126,815 B2 * 10/2006 Hwang et al. .......... 361/679.06
7,424,994 B2 * 9/2008 Jeong ...................... 248/278.1

* cited by examiner

*Primary Examiner*—Amy J Sterling
*Assistant Examiner*—Tan Le (57) ABSTRACT

A pivot support device and a display apparatus supported thereon are provided. The display apparatus includes a housing, a base plate, a support member, and a cover. The housing includes a back plate having an opening on it. The base plate is fixed within the opening. The support member has a pivot end being rotatably coupled to the base plate. The cover is disposed on the pivot end of the support member and moves in connection with the pivot end. The pivot end has a first positioning device while the cover has a second positioning device. The first positioning device engages with the second positioning device to restrict a relative rotation between the cover and the pivot end of the support member. The base plate has a first guidance member while the cover has a second guidance member, and both first and second guidance members are in an arc distribution. The second guidance member movably engages with the first guidance member, enabling the cover and the support member to produce movements relative to the base plate.

26 Claims, 11 Drawing Sheets

PIVOT SUPPORT DEVICE AND A DISPLAY APPARATUS SUPPORTED THEREON

CROSS-REFERENCE TO RELATED APPLICATIONS

This application claims the right of priority based on Taiwan Patent Application No. 095120215 entitled "A PIVOT SUPPORT DEVICE AND A DISPLAY APPARATUS SUPPORTED THEREON," filed on Jun. 7, 2006, which is incorporated herein by reference and assigned to the assignee herein.

BACKGROUND OF THE INVENTION

1. Field of the Invention

The present invention generally relates to a pivot support device; particularly, the present invention relates to a pivot support device and a display apparatus supported thereon.

2. Description of the Prior Art

Viewing angle is a key parameter for the visual performance of the display devices, especially for those apparatuses that utilize liquid crystal display (LCD) inside. Unfortunately, some of the conventional LCD displays today have a limited viewing angle. Consequently, they lose contrast and fail to maintain their best color performance when viewed from some viewing directions. While the manufacturers are trying hard to increase the viewing angles of their display products, the mechanical design of the supporting mechanism for the display apparatus may also be crucial for many reasons, such as to provide a convenient method for adjusting the pivotable angle of the panel for better viewing direction and multi-viewer applications. In the design of the supporting mechanism for the display apparatuses that can also adjust the pivotable angle of the display apparatus mounted thereon, a pivot support device is usually used. Therefore, optimizing the maximum supporting force while providing a convenient angle-adjusting capability has become a goal for the designers to strive for. Further, as the functional and structural designs of the display apparatuses diversify day by day, the designs of the supporting mechanism also need to be improved in order to accommodate the diverse changes in the display apparatuses.

Figure 1:
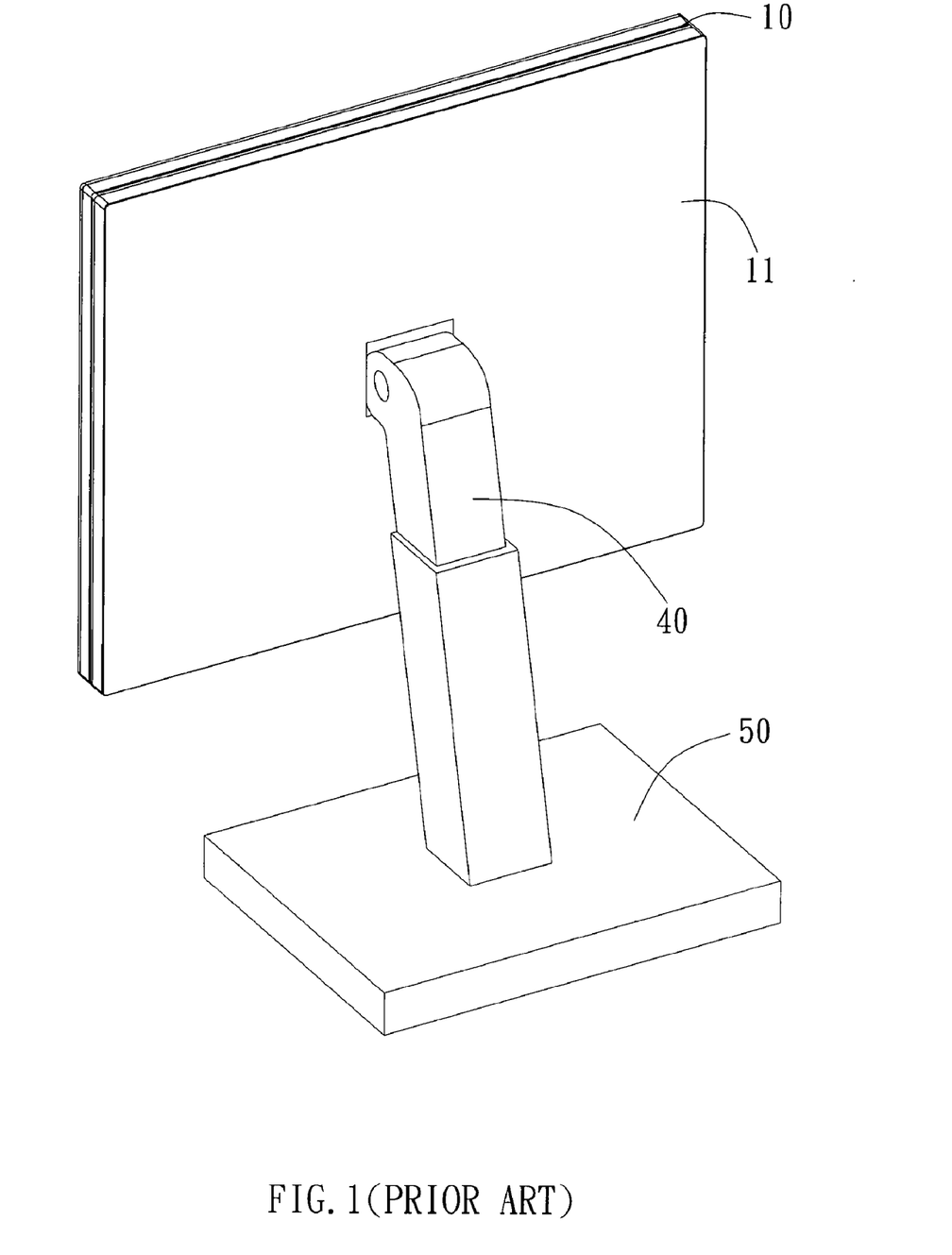
FIG. 1 is a perspective view showing the conventional liquid crystal display (LCD) apparatus.

FIG. 1 shows a conventional design of a support mechanism of an LCD device. As shown in FIG. 1, the LCD device includes a housing 10, a support member 40, and a base 50. One end of the support member 40 is fixed to the base 50, and the other end of the support member 40 is pivotably connected to the center of a back plate 11 of the housing 10. Through the pivotal connection between the support member 40 and the housing 10, the housing 10 and the LCD panel can be adjusted freely to different pivotable angles.

However, as the design of the support mechanism shown in FIG. 1, the support member 40 is connected to the housing 10 externally. Furthermore, a certain part of the pivotal device needs to be disposed inside one end of the support member 40. Therefore, the thickness of the support member 40 cannot be reduced easily without a careful consideration or design, making the overall thickness of the LCD device increase and the LCD device appear bulky. In addition, in this design, it is difficult to make variations on the shape of the support member 40, and thus it limits the room for further improvements in the structural design of the LCD device.

SUMMARY OF THE INVENTION

It is an object of the present invention to provide a pivot support device, and the pivot portion of the pivot support device is thinner in volume.

It is another object of the present invention to provide a pivot support device that is easy to assemble.

It is another object of the present invention to provide a display apparatus that is designed to have a flat backside surface.

It is another object of the present invention to provide a display apparatus that is easy to assemble.

The display apparatus mainly comprises a housing and a pivot support device. The pivot support device is connected to the back of the housing, for holding the housing perpendicularly to a surface. The back of the housing includes a back plate, and an opening is formed on the back plate. Furthermore, the inside of the opening includes a connecting face. The pivot support device includes a base plate, a support member, and a cover. The base plate is fixed to the housing, and it is located inside the opening of the back plate of the housing. The base plate includes a first guidance member having an arc distribution. In the preferred embodiment, the base plate is a circular-shaped plate, and the first guidance member is a circular arc-shaped track formed by the circular arc-shaped rim of the base plate. Furthermore, the circular arc-shaped rim has a plurality of breaches.

The support member includes a pivot end and a support member body. The pivot end is rotatably coupled to the base plate, and it is preferably coupled to the base plate at the rotation center of the first guidance member. The pivot end preferably includes a plate that is parallel to the base plate, and the plate is coupled to the center of the base plate. The base plate has a guiding rod, and the guiding rod is movably engaging with a guiding groove of the pivot end. The guiding rod and the guiding groove are to guide the base plate to rotate relative to the pivot end. At the same time, the guiding rod and the guiding groove restrict this relative rotational displacement to a predetermined range.

The cover is disposed on the pivot end of the support member, and it is movable in combination with the pivot end. The cover is preferably a circular-shaped plate, and the size and shape of the cover corresponds to the opening of the back plate. The cover includes a hollow, and the support member extends out of the cover through the hollow.

The pivot end of the support member has a first positioning device, and the cover has a second positioning device. The first positioning device engages with the second positioning device so as to restrain the cover from rotating relatively to the pivot end of the support member. Furthermore, the first positioning device and the second positioning device provide a convenient way for assembling the pivot support device easily. In the preferred embodiment, the first positioning device includes at least a positioning hole, and the second positioning device includes at least a positioning pillar.

The cover includes a second guidance member having an arc distribution. The second guidance member is movable along the first guidance member while engaging with the first guidance member, enabling both the cover and the support member to move with respect to the base plate. In the preferred embodiment, the second guidance member includes a plurality of clasps disposed on the rim of the cover, and the clasps are used for engaging with the circular arc-shaped rim of the base plate. When the cover and the support member rotate relative to the base plate, each clasp slides along the circular arc-shaped rim, enabling the cover to rotate, and at the same time restrains the cover from moving in a direction normal to the cover itself. When the cover rotates and the clasp moves to the position facing the breach on the circular arc-shaped rim, the cover is released from the restrain of the circular arc-shaped rim, enabling the clasp to move in or out of the breach. However, when the cover rotates and the clasp moves away from the position facing the breach, the cover is restrained by the circular arc-shaped rim from moving in the direction normal to the cover itself.

DETAILED DESCRIPTION OF THE PREFERRED EMBODIMENT

The present invention provides a display apparatus and a pivot support device used by the display apparatus. The display apparatus discussed here preferably includes a liquid crystal display (LCD) device. In another embodiment, however, the display apparatus may include a light-emitting diode (LED) display device or other similar display devices. The pivot support device of the present invention is preferably used in combination with the display apparatus. It is preferably to be a supporting member for the display apparatus, which provides the necessary supporting force for the display apparatus. In another embodiment however, the pivot support device can be used in combination with any other devices that require the use of a supporting member.

Figure 2:
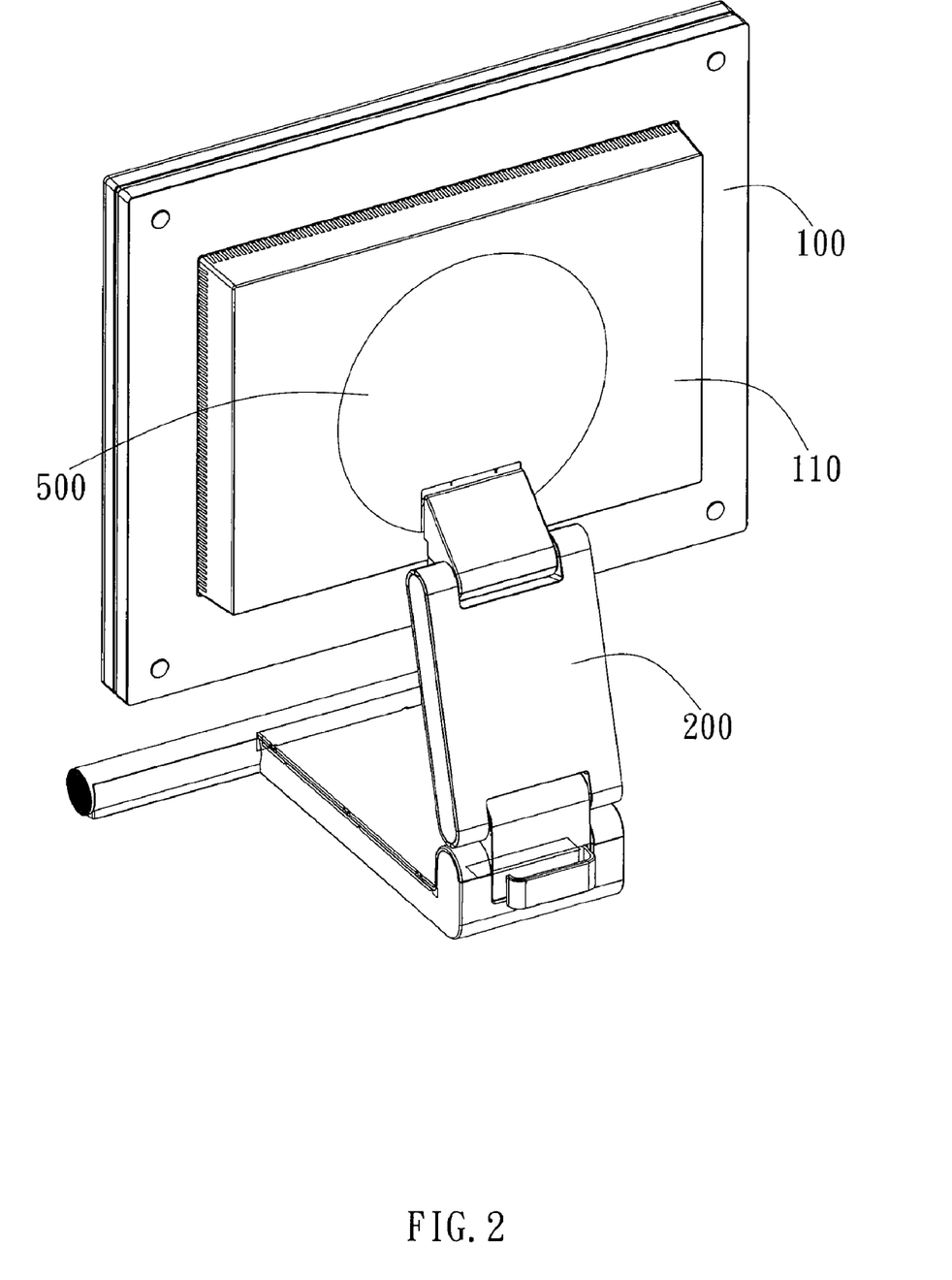
FIG. 2 is a perspective view showing an embodiment of the pivot support device and the display apparatus of the present invention.

FIG. 2 illustrates an embodiment showing the display apparatus and the pivot support device of the present invention. In this embodiment, the display apparatus is a LCD device. As shown in FIG. 2, the display apparatus mainly comprises a housing 100 and a pivot support device 200. The pivot support device 200 is connected to the back of the housing 100, for holding the housing 100 perpendicularly to a surface. Furthermore, the horizontal and vertical pivotable angles of the housing 100 can be adjusted through the pivot support device 200, in order to satisfy the different viewing directions of the viewers.

Figure 3:
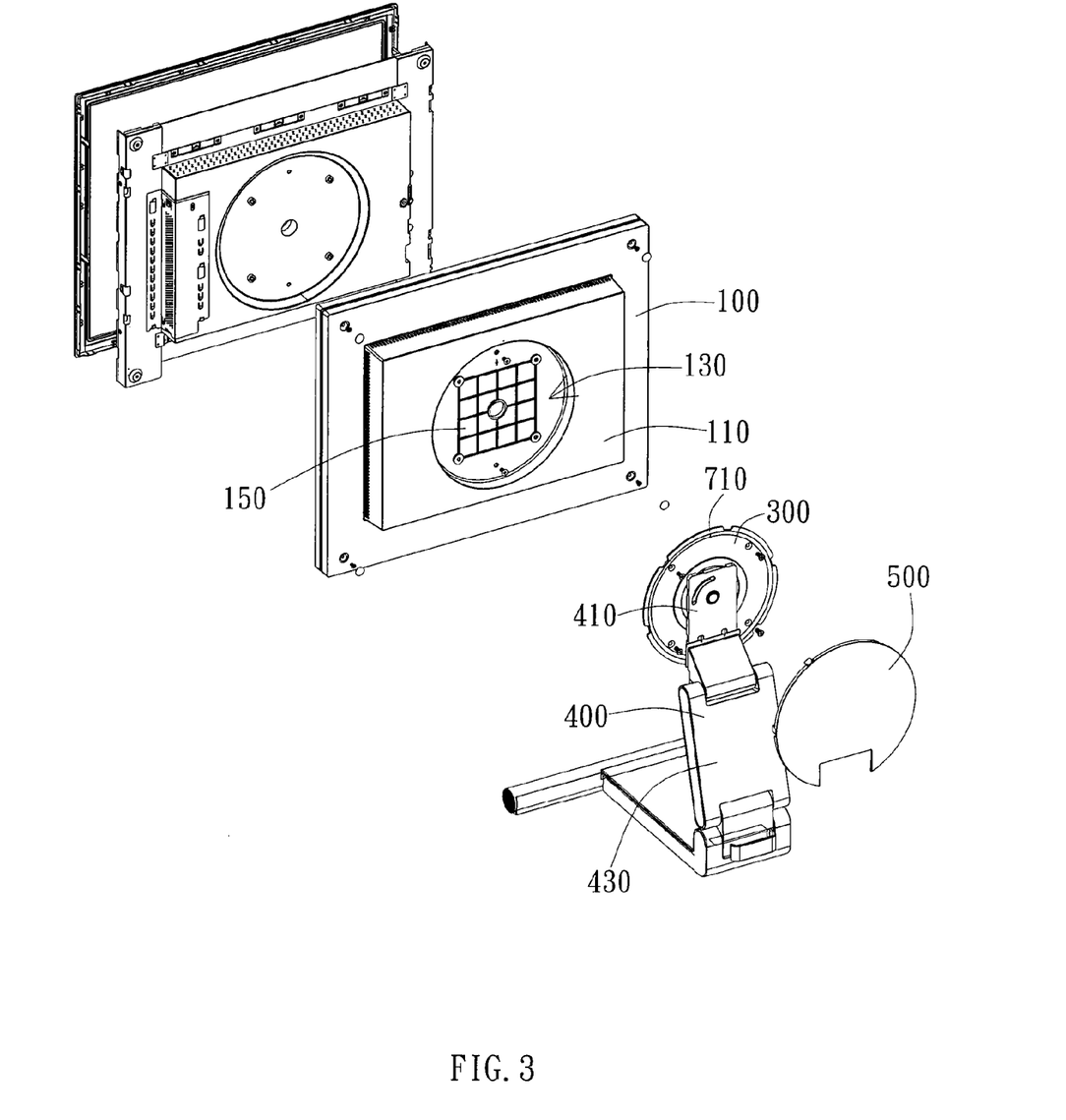
FIG. 3 is an explosive view showing the embodiment of FIG. 2.

In the preferred embodiment shown in FIG. 3, the back of the housing 100 includes a back plate 110. The back plate 110 discussed here is preferably referring to the outer shell section of the back side of the display panel disposed on the display device. An opening 130 is formed on the back plate 110. In the embodiment shown in FIG. 3, the opening 130 is preferably an opening of circular shape, and inside the opening 130 the housing 100 includes a connecting face 150. In the preferred embodiment, the back plate 110 is made of plastic material, and the connecting face 150 is made of metallic material. In another embodiment, however, the back plate 110 and the connecting face 150 can be made of different materials to accommodate the requirements of the design.

As shown in FIG. 3, the pivot support device 200 includes a base plate 300, a support member 400, and a cover 500. The base plate 300 is fixed to the housing 100, and it is received inside the opening 130 of the back plate 110 of the housing 100. In the preferred embodiment shown in FIG. 3, the base plate 300 is fixed to the connecting face 150 of the housing 100, wherein it is preferably screwed to the connecting face 150. In another embodiment, however, the base plate 300 can be fixed to the connecting face 150 through other methods, such as engagement, adhesion, etc. Furthermore, each of the connecting face 150 and the base plate 300 preferably has at least one positioning device, and the positioning device of the connecting face 150 corresponds to the positioning device of the base plate 300. This pair of corresponding positioning devices is provided for fixing the base plate 300 to the connecting face 150.

The base plate 300 includes a first guidance member 710 having an arc distribution. In the embodiment shown in FIG. 4, the base plate 300 is a circular-shaped plate, and the first guidance member 710 is a circular arc-shaped track formed by a circular arc-shaped rim 350 of the base plate 300. The areas in the proximity of the circular arc-shaped rim 350 on the base plate 300 are slightly bent, creating spaces between the housing 100 and the base plate 300 when the base plate 300 is assembled to the housing 100. The spaces are provided for allowing the cover 500 to engage with the base plate 300 while the base plate 300 is assembled to the housing 100. Furthermore, in the embodiment shown in FIG. 4, the circular arc-shaped rim 350 has a plurality of breaches 351. Except two specific adjacent breaches 353, the breaches 351 are distributed evenly along the circular arc-shaped rim 350, having an even spatial interval between each of the two adjacent breaches 351. In another embodiment, however, the circular arc-shaped rim 350 need not necessarily have any breaches 351.

Figure 4:
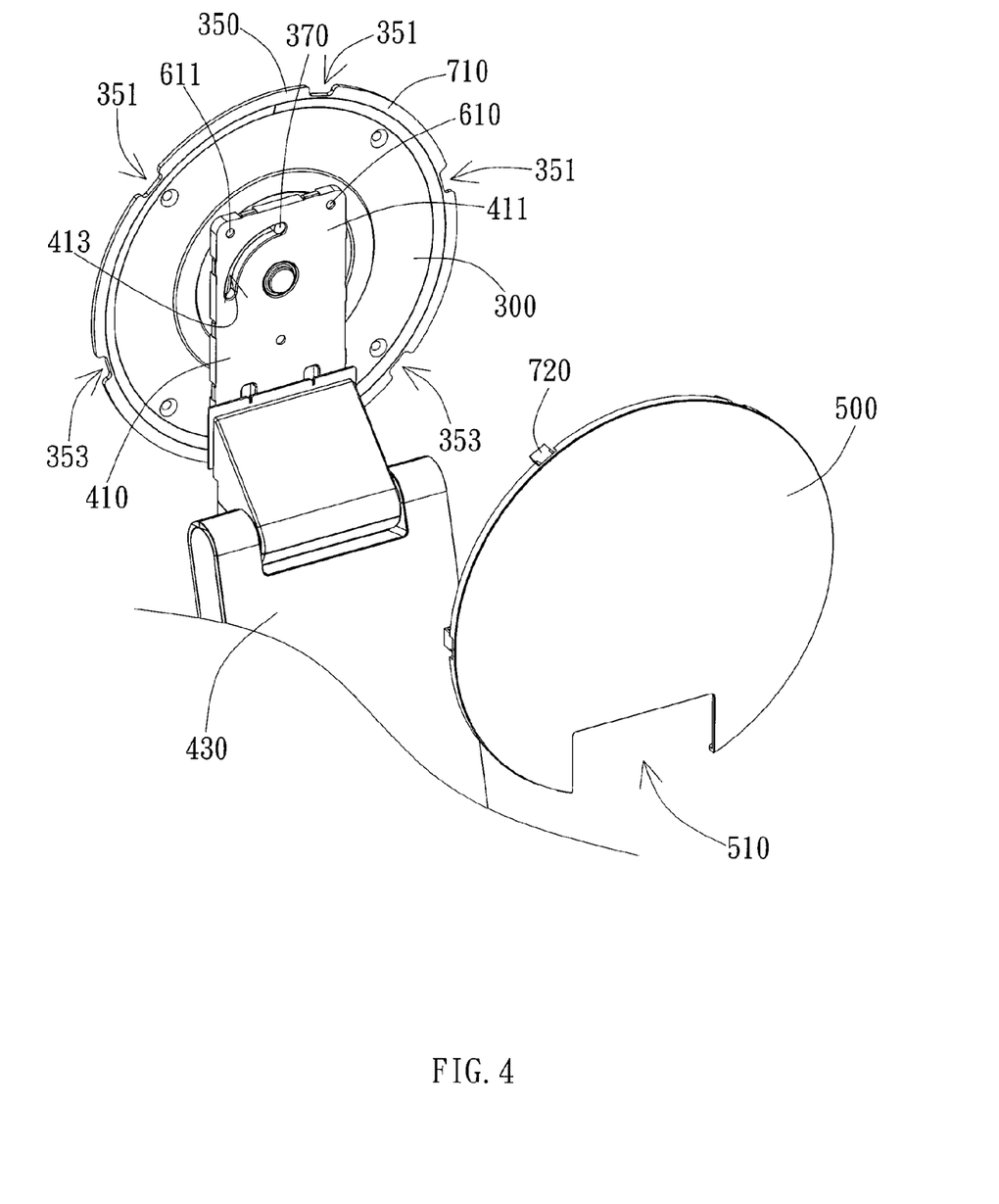
FIG. 4 is a perspective view showing an embodiment of the base plate, the support member, and the cover.

As shown in FIG. 3 and FIG. 4, the support member 400 includes a pivot end 410 and a support member body 430. In the embodiment shown in FIG. 4, the bottom of the pivot end 410 is rotatably coupled to the support member body 430. In another embodiment, however, the pivot end 410 may be fixed to the support member body 430 or can be integrated into the support member body 430. Furthermore, the pivot end 410 is rotatably coupled to the base plate 300, and it is preferably coupled to the base plate 300 at the rotation center of the first guidance member 710. As shown in FIG. 4, the pivot end 410 preferably includes a plate 411 that is parallel to the base plate 300, and the plate 411 is coupled to the center of the base plate 300. The base plate 300 has a guiding rod 370, and the guiding rod 370 is movably engaging with a guiding groove 413 of the pivot end 410. The guiding rod 370 and the guiding groove 413 are to guide the base plate 300 to rotate relative to the pivot end 410. At the same time, the guiding rod 370 and the guiding groove 413 restrict this relative rotational displacement to a predetermined range. In the preferred embodiment, the length of the guiding groove 413 is no more than the distance between two adjacent breaches 351 of the circular arc-shaped rim 350. Furthermore, the guiding groove 413 includes a circular arc-shaped guiding groove, and it is used to guide the base plate 300 to rotate relative to the pivot end 410.

The cover 500 is disposed on the pivot end 410 of the support member 400, and it is movable in combination with the pivot end 410. As shown in FIG. 3, the cover 500 is preferably a circular-shaped plate, and the size and the shape of the cover 500 corresponds to the opening 130 of the back plate 110. Furthermore, the cover 500 is preferably level with the back plate 110 of the housing 100 when it is assembled to the housing 100, and the cover 500 can rotate relative to the back plate 110. The cover 500 includes a hollow 510, and the support member 400 extends out of the cover 500 through the hollow 510. The hollow 510 preferably locates on the rim of the cover 500. In another embodiment however, the hollow 510 is formed within the rim of the cover 500. Yet in another embodiment, the cover 500 can be smaller than the opening 130 of the back plate 110, enabling the support member 400 to extend out of the opening 130 through the space between the cover 500 and the back plate 110.

Figure 5:
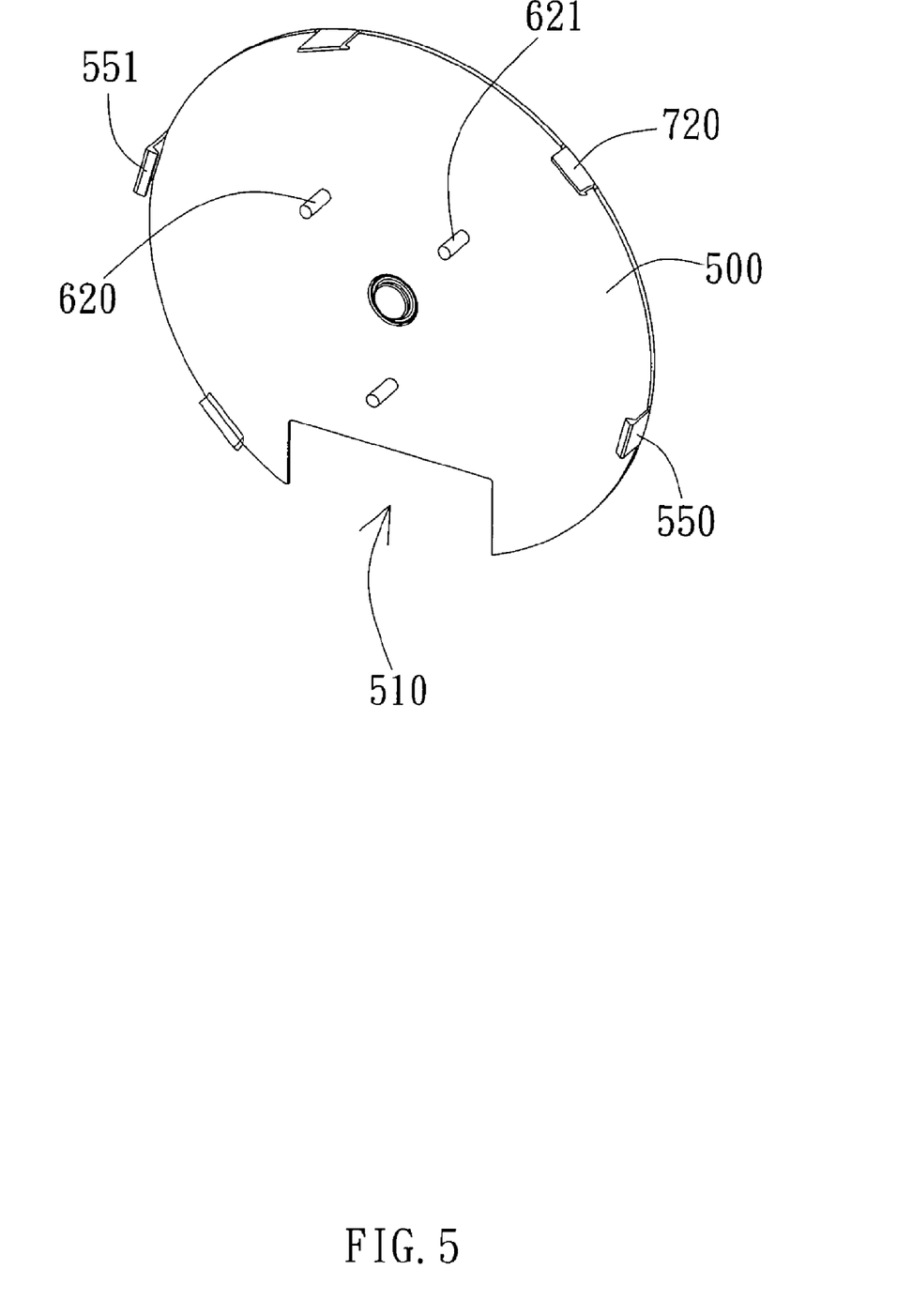
FIG. 5 is a view showing an embodiment of the cover.

As shown in FIG. 4 and FIG. 5, the pivot end 410 of the support member 400 has a first positioning device 610, and the cover 500 has a second positioning device 620. The first positioning device 610 engages with the second positioning device 620 so as to restrain the cover 500 from rotating relative to the pivot end 410 of the support member 400. Furthermore, the first positioning device 610 and the second positioning device 620 provide a convenient way for assembling the pivot support device easily. As the embodiment shown in FIG. 4, the first positioning device 610 on the pivot end 410 includes at least a positioning hole 611. As shown in FIG. 5, the second positioning device 620 on the cover 500 includes at least a positioning pillar 621 that corresponds to the positioning hole 611. The positioning pillar 621 engages with the positioning hole 611 so as to enable the cover 500 to rotate in combination with the pivot end 410. In another embodiment, however, the positioning pillar 621 is disposed on the pivot end 410, and the positioning hole 611 is disposed on the cover 500.

Figure 6:
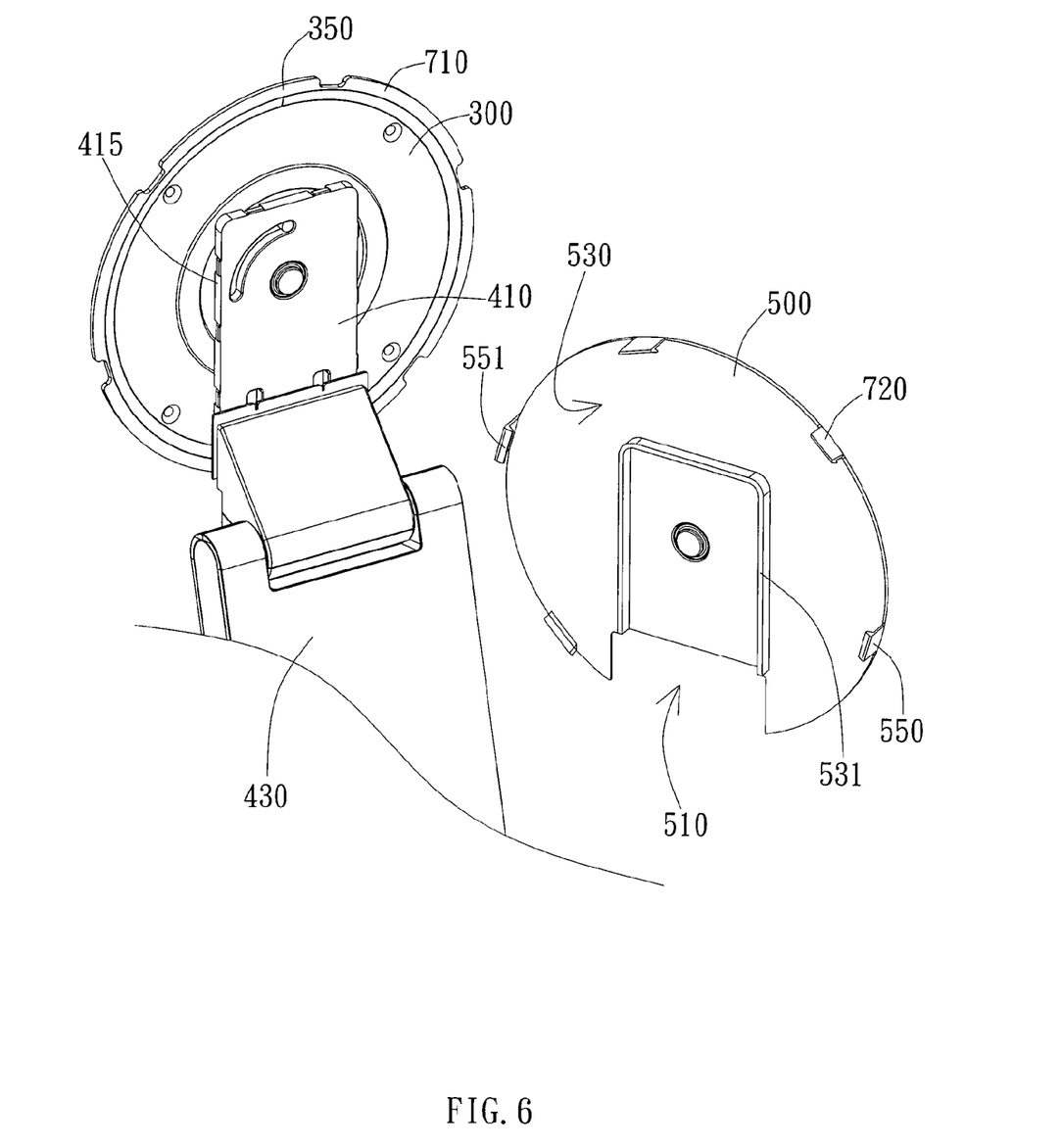
FIG. 6 is a perspective view showing an embodiment of the first positioning device and the second positioning device.

FIG. 6 illustrates another embodiment of the first positioning device 610 and the second positioning device 620. As shown in FIG. 6, the first positioning device 610 is a side wall 415 of the pivot end 410. Furthermore, a recess is formed on an inner face 530 of the cover 500, and the second positioning device 620 is a recess wall 531 of the recess that corresponds to the side wall 415 of the pivot end 410. When the pivot end 410 is disposed inside the recess of the cover 500, the side wall 415 touches the recess wall 531, enabling the pivot end 410 to rotate in combination with the cover 500.

Figure 7:
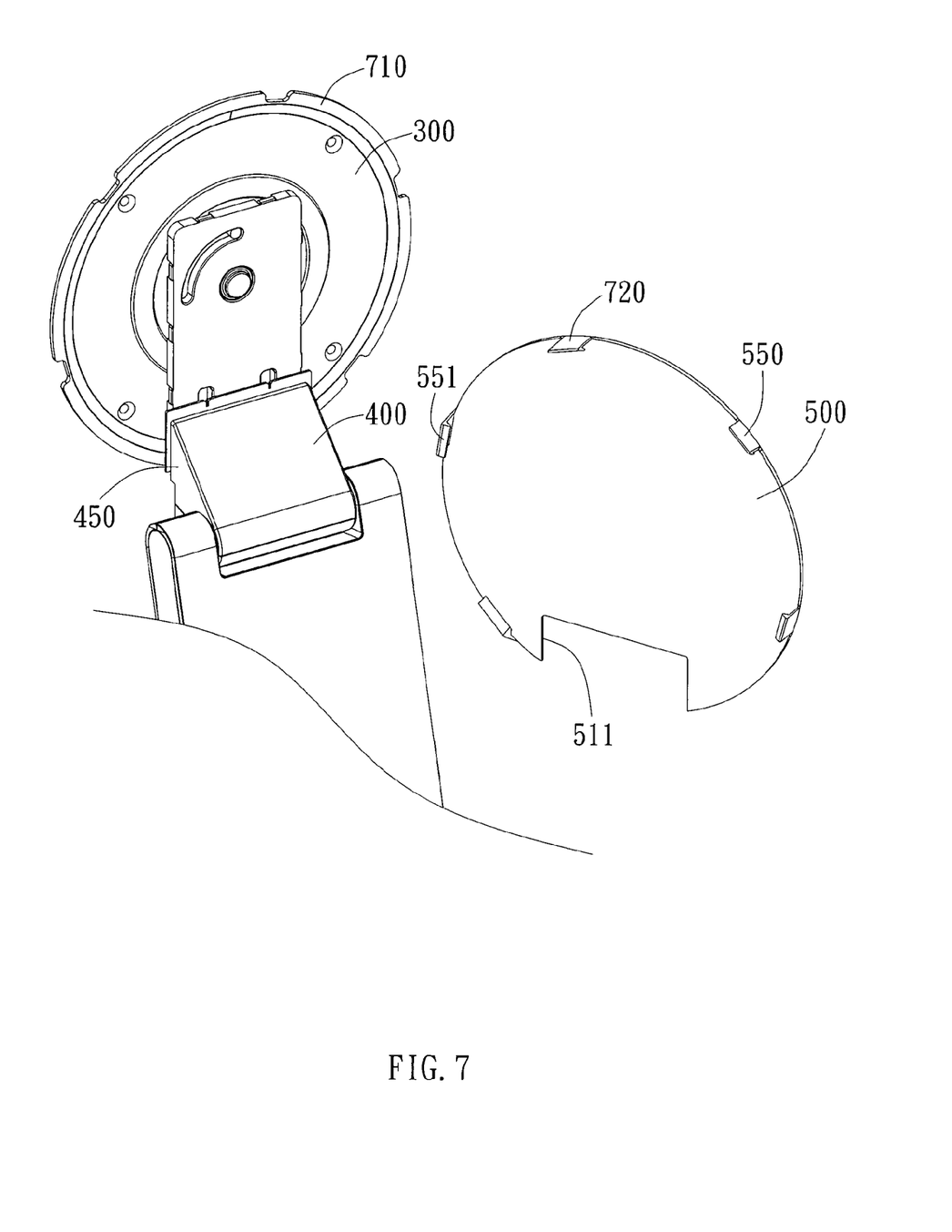
FIG. 7 is a perspective view showing another embodiment of the first positioning device and the second positioning device.

As shown in FIG. 7, an incurved wall 511 of the hollow 510 of the cover 500 can act as the second positioning device 620. Furthermore, a side wall 450 of the support member 400 that corresponds to the incurved wall 511 can act as the first positioning device 610. When the cover 500 is assembled to the support member 400, the support member 400 extends out of the cover 500 through the hollow 510. At the same time, the incurved wall 511 touches the side wall 450 of the support member 400 so as to restrain the cover 500 from rotating relative to the support member 400.

As shown in FIG. 5, FIG. 6, and FIG. 7, the cover 500 includes a second guidance member 720 having an arc distribution. The second guidance member 720 is movable along the first guidance member 710 while engaging with the first guidance member 710, enabling both the cover 500 and the support member 400 to move with respect to the base plate 300. As shown in FIG. 5, FIG. 6, and FIG. 7, the second guidance member 720 includes a plurality of clasps 550 disposed on the rim of the cover 500. Each clasp 550 has a protruding hook 551, and the protruding hook 551 engages with the circular arc-shaped rim 350 of the base plate 300. When the cover 500 and the support member 400 rotate relative to the base plate 300, each clasp 550 slides along the circular arc-shaped rim 350 so as to guide the cover 500 to rotate, and at the same time to restrain the cover 500 from moving in a direction normal to the cover 500 itself.

Figure 8A:
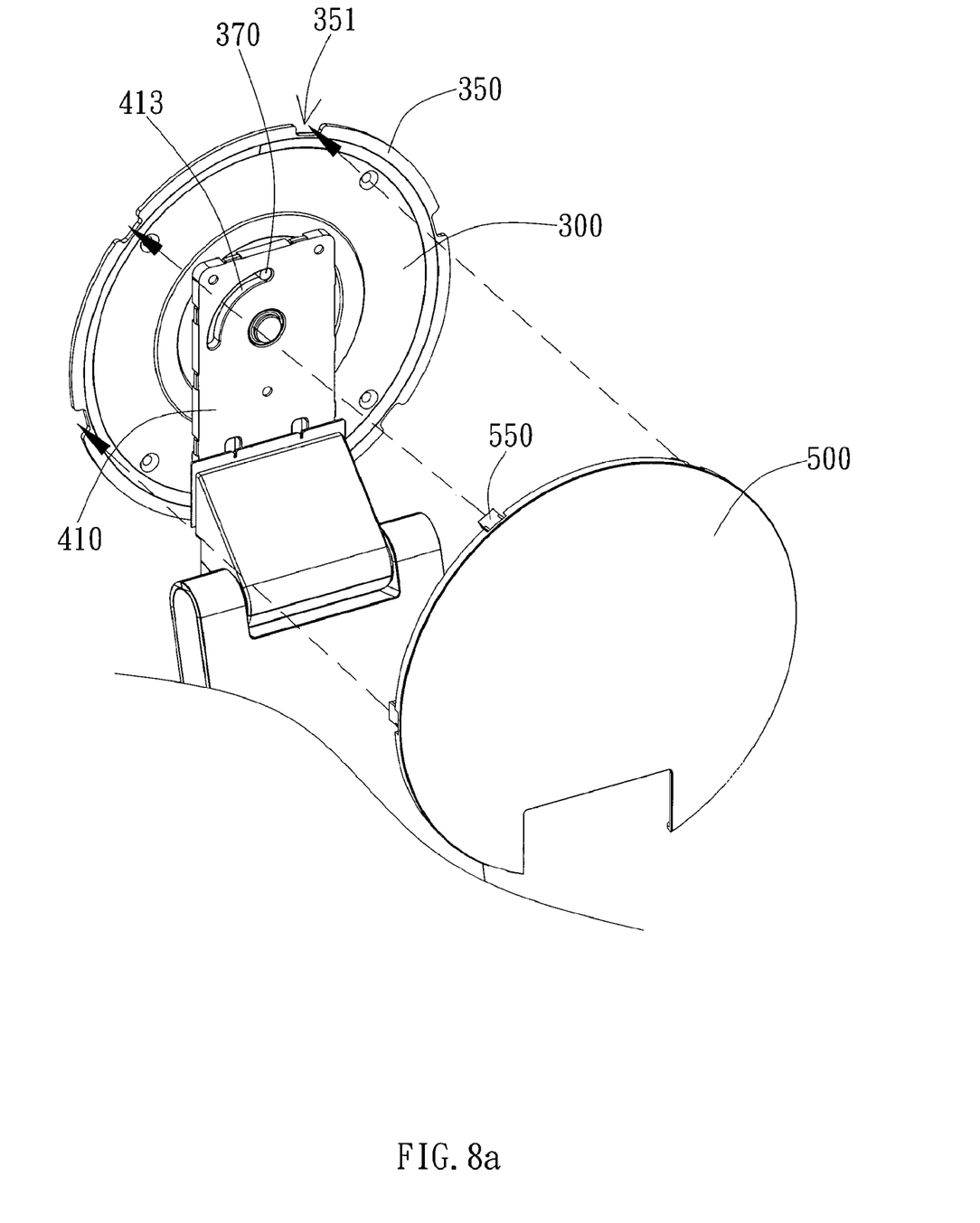
FIG. 8a is a perspective view explaining an embodiment of the base plate and the cover.
Figure 8B:
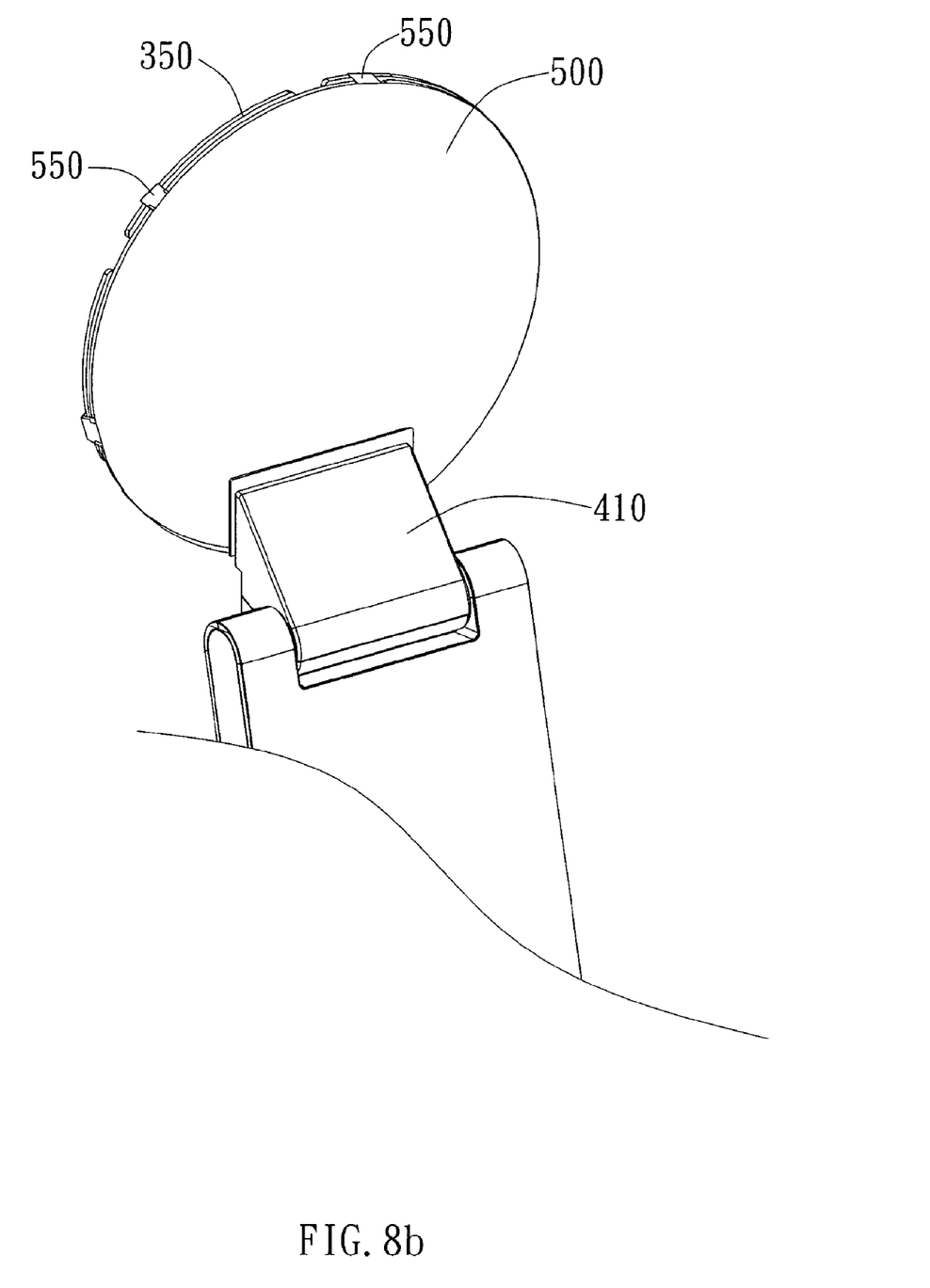
FIG. 8b is a perspective view explaining another embodiment of the base plate and the cover.

As shown in FIG. 8a, when the cover 500 rotates and the clasp 550 moves to the position facing the breach 351 on the circular arc-shaped rim 350, the cover 500 is released from the restrain of the circular arc-shaped rim 350, enabling the clasp 550 to move in or out of the breach 351. However, when the cover 500 rotates and the clasp 550 moves away from the position facing the breach 351, as shown in FIG. 8b, the cover 500 is restrained by the circular arc-shaped rim 350 from moving in the direction normal to the cover 500 itself. In order to let the clasp 550 move out of the breach 351 easily, the position of each clasp 550 and the interval between two adjacent clasps 550 have to correspond with the position of each breach 351 and the interval between two adjacent breaches 351. Furthermore, the length of the guiding groove 413 on the pivot end 410 is no more than the distance between two adjacent clasps 550. Consequently, while rotating within the pivotable range, which is defined and restricted by the guiding groove 413, the cover 500 can only be disengaged from the base plate 300 at one specific position.

Figure 9:
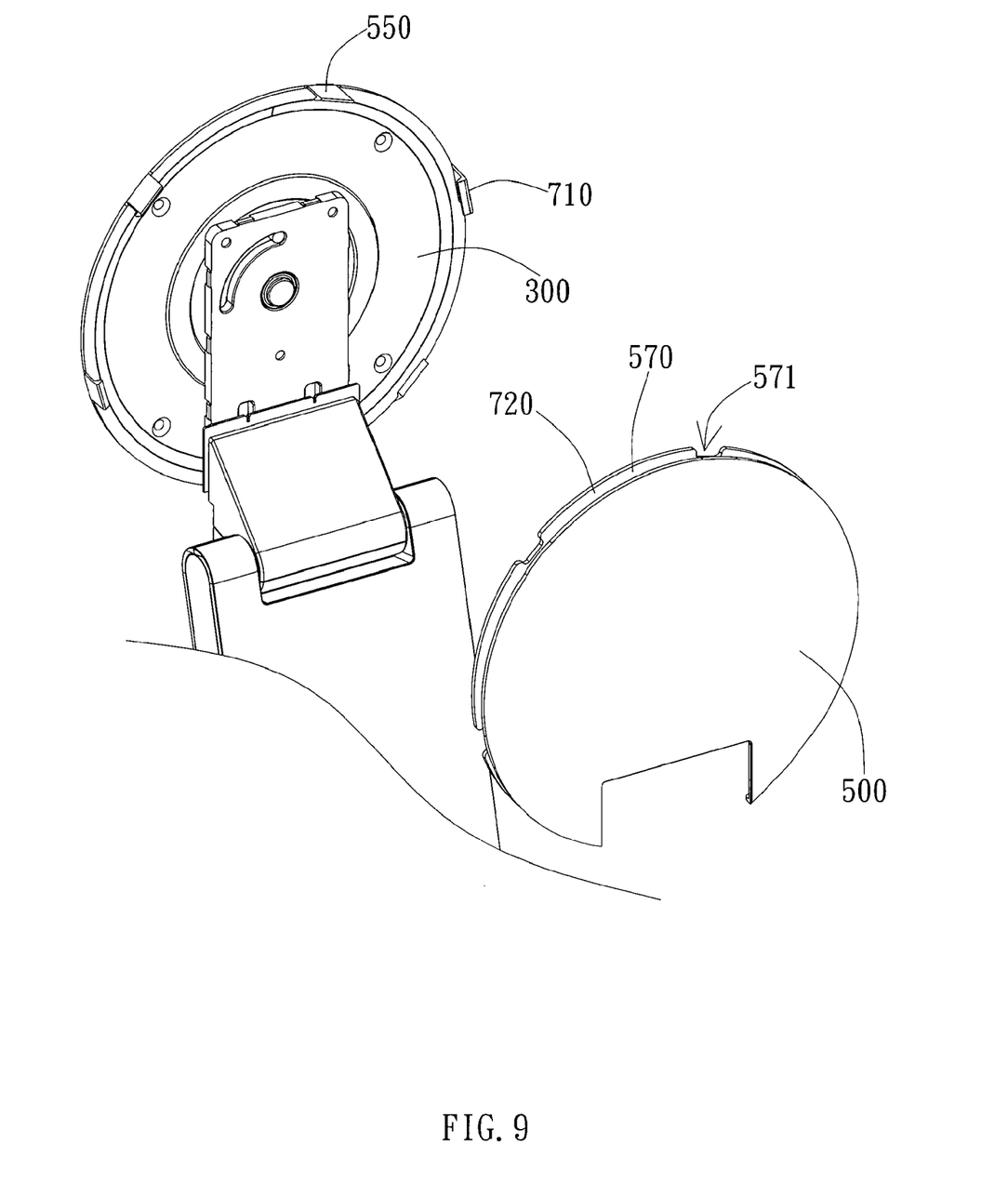
FIG. 9 is a perspective view showing an embodiment of the first guidance member and the second guidance member.

FIG. 9 illustrates another embodiment of the first guidance member 710 and the second guidance member 720. In the embodiment, a circular arc-shaped rim 570 of the cover 500 is the second guidance member 720, and the clasp 550 disposed on the base plate 300 is the first guidance member 710. The circular arc-shaped rim 570 of the cover 500 preferably has at least one breach 571, for allowing the clasp 550 to move out of the breach 571 and enabling the cover 500 to be disengaged from the base plate 300.

Figure 10:
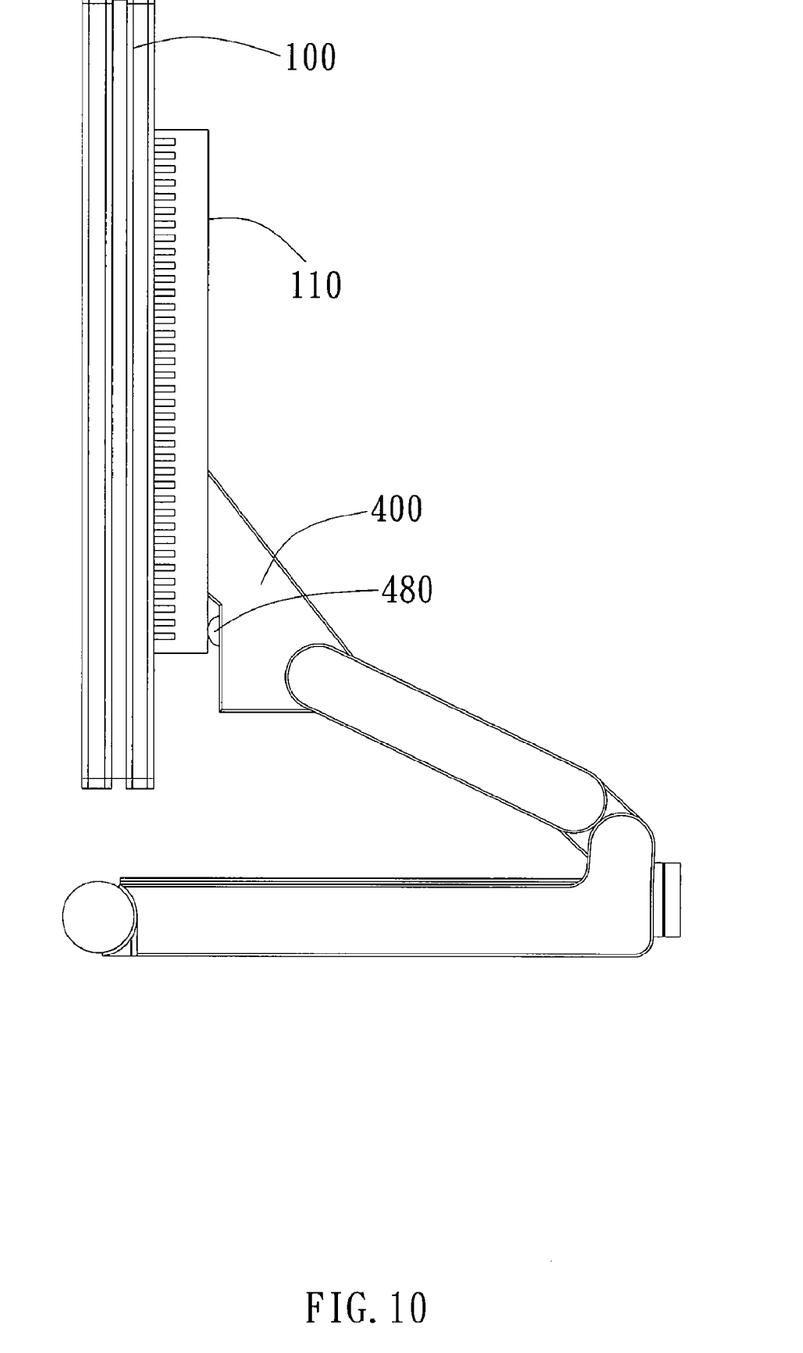
FIG. 10 is a lateral view of an embodiment of the display apparatus.

As shown in FIG. 10, an anti-abrasion device 480 is disposed on the surface of the support member 400 facing the back plate 110 of the housing 100. In the preferred embodiment, the anti-abrasion device 480 is a protrusion, and the tip of the protrusion touches the back plate 110 of the housing 100. Due to the anti-abrasion device 480, the contacting area between the support member 400 and the back plate 110 of the housing 100 is reduced, which can consequently diminish the possible abrasion between the support member 400 and the back plate 110 of the housing 100. Furthermore, the anti-abrasion device 480 can further prevent the abrasion due to the direct contact between the support member 400 and the back plate 110. In another embodiment, however, the anti-abrasion device 480 can be a gasket or a surface that is made of materials having low-friction properties, which can be used to reduce the level of damages due to abrasion.

Although the preferred embodiments of the present invention have been described herein, the above description is merely illustrative. Further modification of the embodiments herein disclosed will occur to those skilled in the respective arts and all such modifications are deemed to be within the scope of the invention as defined by the appended claims.

The invention claimed is:

1. A pivot support device, for using in combination with a housing, comprising:
   a base plate configured to be fixed to said housing, said base plate including a first guidance member;
   a support member having a pivot end, said pivot end being rotatably coupled to said base plate and including a first positioning device; and a cover disposing on said pivot end of said support member, said cover moving in combination with said pivot end and including a second positioning device and a second guidance member;

wherein said second guidance member is movable along said first guidance member while engaging with said first guidance member, enabling both said cover and said support member to move with respect to said base plate, and said second positioning device engages with said first positioning device so as to restrict a relative displacement between said cover and said support member, wherein a circular arc-shaped rim of said base plate forms said first guidance member, and wherein said circular arc-shaped rim has a plurality of breaches, and when said second guidance member moves to the position facing said breach, said first guidance member enables said second guidance member to move in a direction normal to said second guidance member.

2. The pivot support device according to claim 1, wherein said pivot end of said support member is coupled to said base plate at a rotation center of said first guidance member.

3. The pivot support device according to claim 1, wherein said second guidance member includes a plurality of clasps disposing on a rim of said cover, and a protruding hook of each said clasp engages with said circular arc-shaped rim of said base plate.

4. The pivot support device according to claim 1, wherein said first positioning device includes at least a positioning hole, and said second positioning device includes at least a positioning pillar that corresponds to said positioning hole of said first positioning device.

5. The pivot support device according to claim 1, wherein said cover includes a hollow, and said support member extends out of side cover through said hollow.

6. The pivot support device according to claim 5, wherein said hollow is formed on a rim of said cover.

7. The pivot support device according to claim 1, wherein said cover and said base plate are circular-shaped plates, and said first guidance member and said second guidance member respectively have an arc distribution.

8. A display apparatus comprising:
a housing having a back plate, said back plate forming an opening;
a base plate being fixed to said housing, said base plate being disposed inside said opening of said back plate and including a first guidance member;
a support member having a pivot end, said pivot end being rotatably coupled to said base plate and including a first positioning device; and
a cover disposed on said pivot end of said support member, said cover rotating relatively to said back plate, moving in combination with said pivot end, closing said opening of said back plate, and including a second positioning device and a second guidance member;
wherein said second guidance member is movable along said first guidance member while engaging with said first guidance member, enabling both said cover and said support member to move with respect to said housing, and said second positioning device engages with said first positioning device so as to restrict a relative displacement between said cover and said support member, wherein a circular arc-shaped rim of said base plate forms said first guidance member, and wherein said circular arc-shaped rim has a plurality of breaches, and when said second guidance member moves to the position facing said breach, said first guidance member enables said second guidance member to move in a direction normal to said second guidance member.

9. The display apparatus according to claim 8, wherein said pivot end of said support member is coupled to said base plate at a rotation center of said first guidance member.

10. The display apparatus according to claim 8, wherein said second guidance member includes a plurality of clasps disposing on a rim of said cover, and a protruding hook of each said clasp engages with said circular arc-shaped rim of said base plate.

11. The display apparatus according to claim 8, wherein said first positioning device includes at least a positioning hole, and said second positioning device includes at least a positioning pillar that corresponds to said positioning hole of said first positioning device.

12. The display apparatus according to claim 8, wherein said cover includes a hollow, and said support member extends out of side cover through said hollow.

13. The display apparatus according to claim 12, wherein said hollow is formed on a rim of said cover.

14. The display apparatus according to claim 8, wherein said cover and said base plate are circular-shaped plates, said cover closes said opening of said back plate of said housing, and said first guidance member and said second guidance member respectively have an arc distribution.

15. A pivot support device, for using in combination with a housing, comprising:
a base plate configured to be fixed to said housing, said base plate including a first guidance member;
a support member having a pivot end, said pivot end being rotatably coupled to said base plate and including a first positioning device; and
a cover disposing on said pivot end of said support member, said cover moving in combination with said pivot end and including a second positioning device and a second guidance member;
wherein said second guidance member is movable along said first guidance member while engaging with said first guidance member, enabling both said cover and said support member to move with respect to said base plate, and said second positioning device engages with said first positioning device so as to restrict a relative displacement between said cover and said support member, wherein a circular arc-shaped rim of said base plate forms said first guidance member, and wherein said second guidance member includes a plurality of clasps disposing on a rim of said cover, and a protruding hook of each said clasp engages with said circular arc-shaped rim of said base plate.

16. The pivot support device according to claim 15, wherein said pivot end of said support member is coupled to said base plate at a rotation center of said first guidance member.

17. The pivot support device according to claim 15, wherein said first positioning device includes at least a positioning hole, and said second positioning device includes at least a positioning pillar that corresponds to said positioning hole of said first positioning device.

18. The pivot support device according to claim 15, wherein said cover includes a hollow, and said support member extends out of side cover through said hollow.

19. The pivot support device according to claim 18, wherein said hollow is formed on a rim of said cover.

20. The pivot support device according to claim 15, wherein said cover and said base plate are circular-shaped plates, and said first guidance member and said second guidance member respectively have an arc distribution.

21. A display apparatus, comprising:

a housing having a back plate, said back plate forming an opening;

a base plate being fixed to said housing, said base plate being disposed inside said opening of said back plate and including a first guidance member;

a support member having a pivot end, said pivot end being rotatably coupled to said base plate and including a first positioning device; and a cover disposed on said pivot end of said support member, said cover rotating relatively to said back plate, moving in combination with said pivot end, closing said opening of said back plate, and including a second positioning device and a second guidance member;

wherein said second guidance member is movable along said first guidance member while engaging with said first guidance member, enabling both said cover and said support member to move with respect to said housing, and said second positioning device engages with said first positioning device so as to restrict a relative displacement between said cover and said support member, wherein a circular arc-shaped rim of said base plate forms said first guidance member, and wherein said second guidance member includes a plurality of clasps disposing on a rim of said cover, and a protruding hook of each said clasp engages with said circular arc-shaped rim of said base plate.

22. The display apparatus according to claim 21, wherein said pivot end of said support member is coupled to said base plate at a rotation center of said first guidance member.

23. The display apparatus according to claim 21, wherein said first positioning device includes at least a positioning hole, and said second positioning device includes at least a positioning pillar that corresponds to said positioning hole of said first positioning device.

24. The display apparatus according to claim 21, wherein said cover includes a hollow, and said support member extends out of side cover through said hollow.

25. The display apparatus according to claim 24, wherein said hollow is formed on a rim of said cover.

26. The display apparatus according to claim 21, wherein said cover and said base plate are circular-shaped plates, said cover closes said opening of said back plate of said housing, and said first guidance member and said second guidance member respectively have an arc distribution.

* * * * *